UNITED STATES PATENT OFFICE.

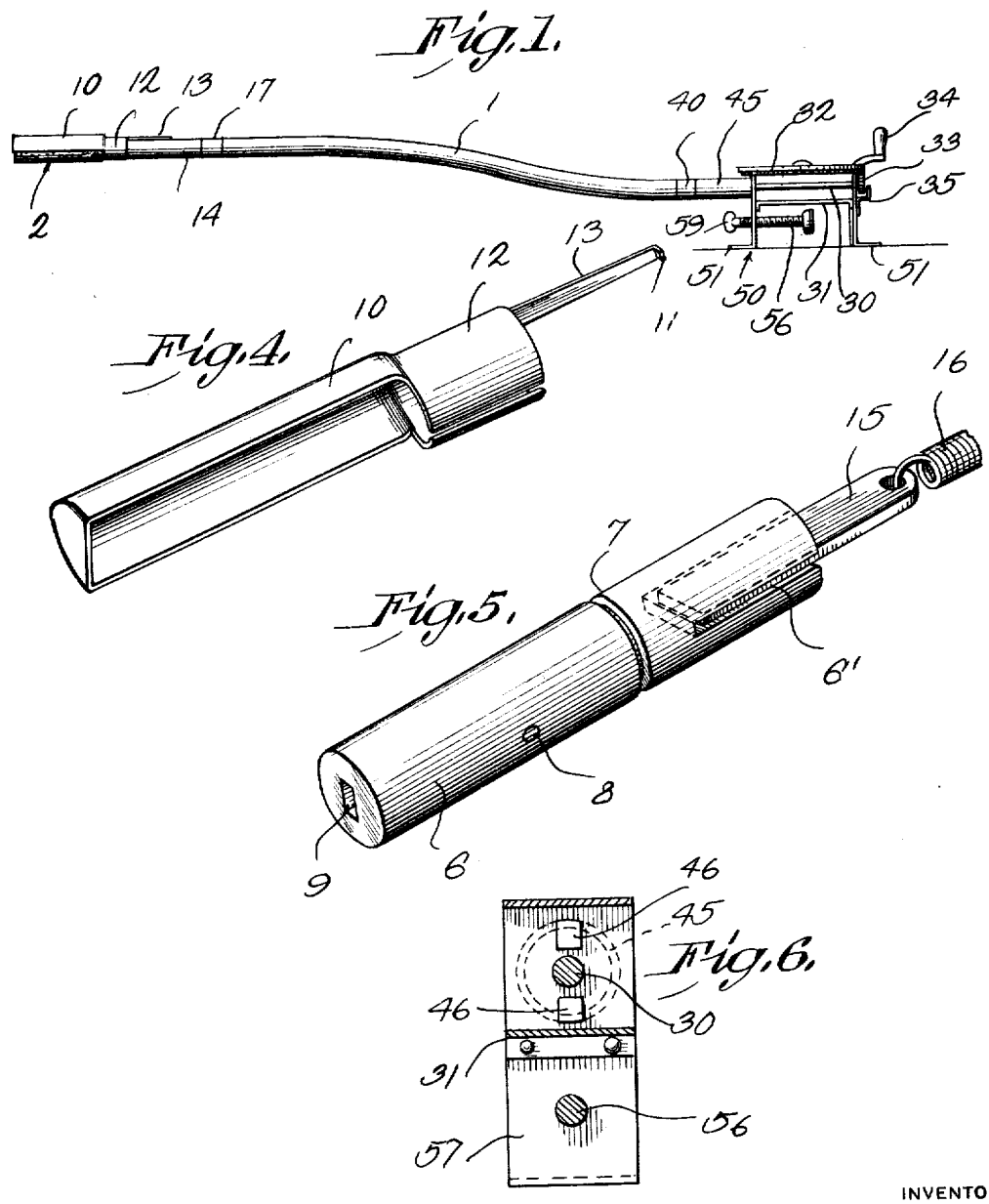

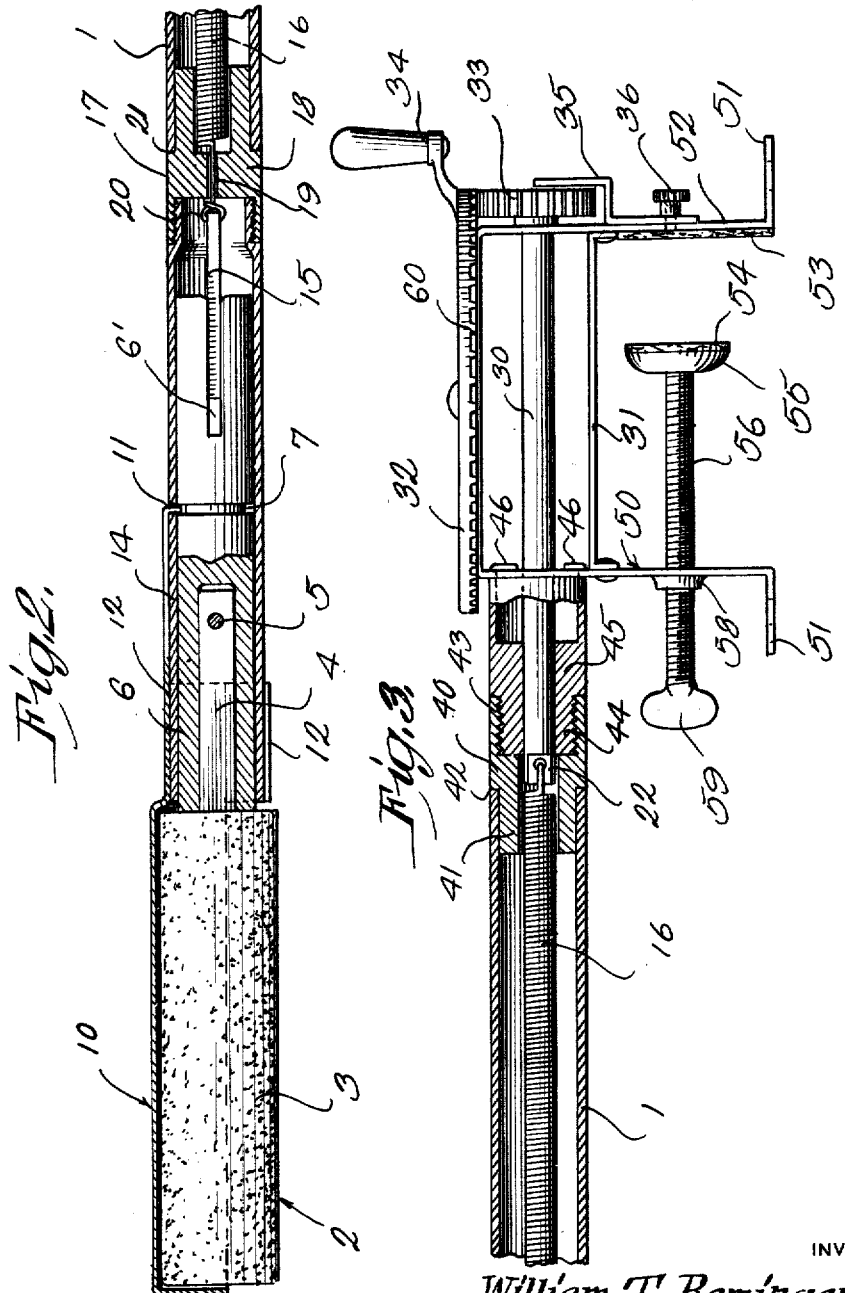

WILLIAM T. REMINGER, OF TIFFIN, OHIO.

ROTARY TOOTH-BRUSH.

1,308,866.  Specification of Letters Patent.  Patented July 8, 1919.

Application filed March 29, 1918. Serial No. 225,559.

*To all whom it may concern:*

Be it known that I, WILLIAM T. REMINGER, a citizen of the United States, residing at Tiffin, in the county of Seneca and State of Ohio, have invented certain new and useful Improvements in Rotary Tooth-Brushes, of which the following is a specification.

This invention relates to brushing and scrubbing, and more particularly to rotary tooth brushes.

The object of the invention is to provide simple and efficient mechanism for rotating the brush to effect rapid and effective cleaning of the teeth and other objects brushed.

Another object is to provide a device of this character, the brush of which may be located at a point remote from its operating mechanism, which latter may be mounted on any suitable support.

Another object is to so construct such a device, that the parts thereof may be readily separated for cleaning and other purposes.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a rotary tooth brush constructed in accordance with this invention, Fig. 2 is an enlarged longitudinal section of the front end or brush portion of the device, Fig. 3 is a similar view of the rear end thereof, Fig. 4 is a detail perspective view of the brush shield or guard detached, Fig. 5 is a perspective view of the member to which the brush is connected, and Fig. 6 is a detail transverse section through the bracket.

In the embodiment illustrated, a flexible hose connection 1 is shown, having a brush 2 mounted at one end and connected at its other end with operating mechanism for the brush as is shown clearly in Fig. 1. The hose 1 may be of any suitable or desired length according to the distance which it is desired to position the brush 2 from its operating mechanism.

The brush 2 comprises a head 3 of bristles, preferably made cylindrical in shape as shown in Fig. 2, with a shank 4 projecting rearwardly therefrom and having an aperture near its free rear end which is designed to receive a pin 5 for connecting it with the coupling member 6. This coupling member 6 is provided intermediately of its ends, preferably midway thereof, with an annular groove 7 designed to receive a laterally extending prong or lip 11 carried by the brush shield or guard 10 and which will presently be described in detail. This coupling member 6 also has an aperture 8 extending transversely therethrough designed to receive the pin 5 which connects the brush shank 4 with said coupling member, the shank 4 of the brush being designed to be inserted in a socket 9 of the coupling. This shank and socket are preferably made angular in cross section to prevent turning of the shank relatively to the coupling.

The rear end of the coupling member 6 is bifurcated as shown at 6' and is designed to receive a key 15 which forms a connector between the coupling 6 and the coiled spring 16.

The brush shield or guard which is designed to protect the gums and cheek of the wearer is shown semi-cylindrical in cross section and closed at its outer end, the inner end thereof having a split clamping band 12 preferably formed integral therewith and which is designed to encircle the coupling 6 as is shown clearly in Fig. 2. Extending rearwardly and longitudinally from the clamping band 12 is a shank or finger 13 on the free end of which is the lip 11 heretofore referred to, and which is designed to enter the groove 7 of the coupling member 6, said lip or prong passing first through an aperture in a casing or shell 14 in which the coupling member 6 is incased as is shown clearly in Fig. 2.

The rear end of this casing 14 is exteriorly threaded for detachable engagement by a coupling 17 which is here shown with a solid central portion 18 having a small bore 19 extending therethrough, through which one end of the wire coil 16 passes, its free end being connected by passing it through the aperture in the key 15, and then bending it into a loop or hook 20. The rear end of this coupling is reduced to receive the hose 1 and has a shoulder 21 at the inner end or base of said reduced portion against which the end of the hose abuts when in operative position as is shown clearly in Fig. 2. The coiled spring 16 which operates as a connector between the coupling member 6 and the rotary shaft 30 has its outer or front end housed within the rear end of the coupling 17 and the rear end thereof is similarly housed in another coupling 40 shown clearly in Fig. 3. This coupling 40 has a reduced extension 41 at its front end on which is mounted the rear end of the hose 1, the terminal of which abuts against the shoulder 42 on said coupling. The rear end of the coupling 40 is internally threaded as shown at 43 and is designed to detachably connect with the threaded extension 44 carried by a connector 45. This connector 45 has lugs 46 which are designed to be passed through and hookedly engaged with apertures in the supporting bracket 50 presently to be described.

From the above description it will be obvious that the turning of shaft 30 by means presently to be described will operate through the coiled spring 16 to turn the coupling 6 and with it the brush head 3, the casing or shell 14 operating as a handle so that the user may position the brush head at any desired inclination or position, and without in any way affecting the movement of said head.

The bracket 50, which carries the operating mechanism for the brush, and which is designed for mounting said mechanism in a suitable support, comprises an inverted U-shaped member having laterally extended apertured feet 51 which are designed to be secured to a support or to simply bear against one face of such a support. The leg 52 of said bracket has a pad 53 on its inner face which is designed to coöperate with a similar pad 54 carried by head 55 of a clamping screw 56. This screw 56 is designed to operate in one leg of the bracket and has threaded engagement with the boss 58 carried by said leg and which is provided of course with a threaded aperture for coöperation with the threads of the screw 56. This clamping screw 56 has a hand grip 59 at its outer end designed for screwing and unscrewing it to secure the bracket to or release it from its support. The pads 53 and 54 are provided so that when the device is attached to a piece of furniture, its engagement therewith will not in any way mar the furniture.

A cross bar 31 connects the legs 52 and 57, and is designed to operate as a brace therefor. Between this cross bar 31 and the cross bar 60 of the bracket is positioned the shaft 30 which is mounted to rotate in the legs 52 and 57 of the bracket and projects at opposite ends beyond the outer face of the legs, one end of said shaft extending through the connector 45 into the coupling 40 where it is connected with the end 22 of the coiled spring 16 as is shown clearly in Fig. 3.

Mounted to revolve on the cross bar 60 of the bracket is a crown gear 32 having teeth on its lower face which are designed to mesh with a cog wheel 33 carried by the rear end of the shaft 30 so that the turning of said crown gear will operate to drive the shaft. A handle 34 extends from the crown gear and is designed for actuating it, although obviously any suitable means may be connected with this gear so that it may be mechanically as well as manually actuated.

A bracket 35 is also mounted on the outer face of the bracket leg 52 and operates as a protector for the cog wheel 33 as is shown clearly in Figs. 1 and 3.

A thumb screw 36 is shown connecting the bracket 35 with the leg 52 and has its inner end bearing against pad 53.

From the above description it will be obvious that when the bracket 50 is mounted on any suitable support, and the brush 2 grasped in one hand of the user, the other hand may be employed for rotating the crown gear 32 to impart motion to said brush in the manner above described, and thereby the actuation of the brush may be controlled by the user and the brush may be positioned at any desired inclination at the will of the user.

The foregoing description and the drawings have reference to what may be considered the preferred or approved form of my invention. It is to be understood that I may make such changes in construction and arrangement and combination of parts, materials, dimensions, et al., as may prove expedient and fall within the scope of the appended claims.

Having thus fully described my invention, what I claim as new and desire to secure by Letters Patent, is:—

1. In a device of the class described, a brush head having a shank extending from one end, a coupling secured to said shank and having an annular groove in its outer face, a casing surrounding said coupling and having an aperture opposite said groove, a brush shield encompassing said head and having a split clamping band at its rear end to clamp around the casing, said band having a rearwardly extending finger with an inturned lip to pass through said aperture in said casing into said annular coupling groove.

2. A device of the class described including a brush having a shank angular in cross section, a driving element with a flat key at one end, a coupling for said brush and key comprising a cylindrical member having an annular groove midway its ends in its outer face, and a longitudinally extending socket in one end shaped to conform to and receive said shank, with its other end bifurcated to receive said key, a casing encompassing said coupling and having an aperture opposite said groove, a brush shield having a rearwardly extending finger with an inturned lip to enter said aperture and groove to hold the shield in position and yet permit the coupling to turn.

In testimony whereof I affix my signature in presence of two witnesses.

WILLIAM T. REMINGER.

Witnesses:
H. B. YUNDT,
PAULINE MAGINNIS.